(12) United States Patent
Lieberman et al.

(10) Patent No.: US 10,698,790 B1
(45) Date of Patent: Jun. 30, 2020

(54) PROACTIVE DEBUGGING

(71) Applicant: EMC Corporation, Hopkinton, MA (US)

(72) Inventors: Amit Lieberman, Raanana (IL); Leehod Baruch, Herzliya (IL); Assaf Natanzon, Tel Aviv (IL); Jehuda Shemer, Kfar Saba (IL); Ron Bigman, Holon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/087,817

(22) Filed: Mar. 31, 2016

(51) Int. Cl.
*G06F 11/36* (2006.01)
*G06F 9/455* (2018.01)

(52) U.S. Cl.
CPC ...... *G06F 11/3612* (2013.01); *G06F 11/3616* (2013.01); *G06F 9/45558* (2013.01); *G06F 11/362* (2013.01); *G06F 2009/45562* (2013.01); *G06F 2009/45591* (2013.01)

(58) Field of Classification Search
CPC .. G06F 8/30; G06F 9/45558; G06F 17/30309; G06F 11/3612; G06F 11/1469
See application file for complete search history.

(56) References Cited

U.S. PATENT DOCUMENTS

| | | | |
|---|---|---|---|
| 7,653,899 B1 * | 1/2010 | Lindahl | G06F 11/3612 717/125 |
| 8,577,842 B1 * | 11/2013 | Nagargadde | G06F 11/1464 707/639 |
| 8,689,214 B2 * | 4/2014 | Marshall | G06F 9/45558 714/45 |
| 8,966,453 B1 * | 2/2015 | Zamfir | G06F 8/30 714/38.1 |
| 9,588,870 B2 * | 3/2017 | Marron | G06F 11/362 |
| 9,875,174 B1 * | 1/2018 | Brandwine | G06F 11/3664 |
| 2009/0138859 A1 * | 5/2009 | Chen | G06F 11/3461 717/131 |
| 2009/0320011 A1 * | 12/2009 | Chow | G06F 11/3612 717/154 |
| 2012/0246640 A1 * | 9/2012 | Marshall | G06F 9/45558 718/1 |
| 2013/0275377 A1 * | 10/2013 | Jaquet | G06F 17/30309 707/640 |
| 2014/0372983 A1 * | 12/2014 | Presley | G06F 11/368 717/124 |

(Continued)

OTHER PUBLICATIONS

U.S. Appl. No. 14/978,351, Storing Application Data as an Enhanced Copy, filed Dec. 22, 2015 by Assaf Natanzon, et al.

*Primary Examiner* — Lewis A Bullock, Jr.
*Assistant Examiner* — Gilles R Kepnang
(74) *Attorney, Agent, or Firm* — Womble Bond Dickinson (US) LLP

(57) ABSTRACT

A bug or problem that occurs during execution of an application is detected and a time at which the problem occurred is stored. An enhanced copy of the application is restored from before the time at which the problem occurred, and the enhanced copy of the application is run. If the problem is reproduced, the application is paused. If the problem is not reproduced, restoration of the enhanced copy, running of the enhanced copy and detection of the problem are repeated for a pre-designated number of times.

19 Claims, 3 Drawing Sheets

(56) References Cited

U.S. PATENT DOCUMENTS

| | | | |
|---|---|---|---|
| 2015/0143367 A1* | 5/2015 | Jia .......................... | G06F 9/5088 |
| | | | 718/1 |
| 2015/0193328 A1* | 7/2015 | Deakin ................. | G06F 11/362 |
| | | | 714/38.1 |
| 2017/0139782 A1* | 5/2017 | Chen ................... | G06F 11/1469 |

* cited by examiner

PROACTIVE DEBUGGING

FIELD

The disclosure herein generally relates to debugging, and particularly relates to reproduction of a problematic behavior or bug that occurs during execution of an application.

BACKGROUND

The process of finding and fixing a problem (i.e., a coding error or bug) in a computer program or application is often a large part of software development. Typically, in order to debug such a problem during production, the problem must be reproduced so that a developer or user can investigate. Conventionally, in an attempt to reproduce the problem, developers try to replicate the circumstances and environment in which the problem occurred.

BRIEF DESCRIPTION OF THE DRAWINGS

The embodiments of the disclosure herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
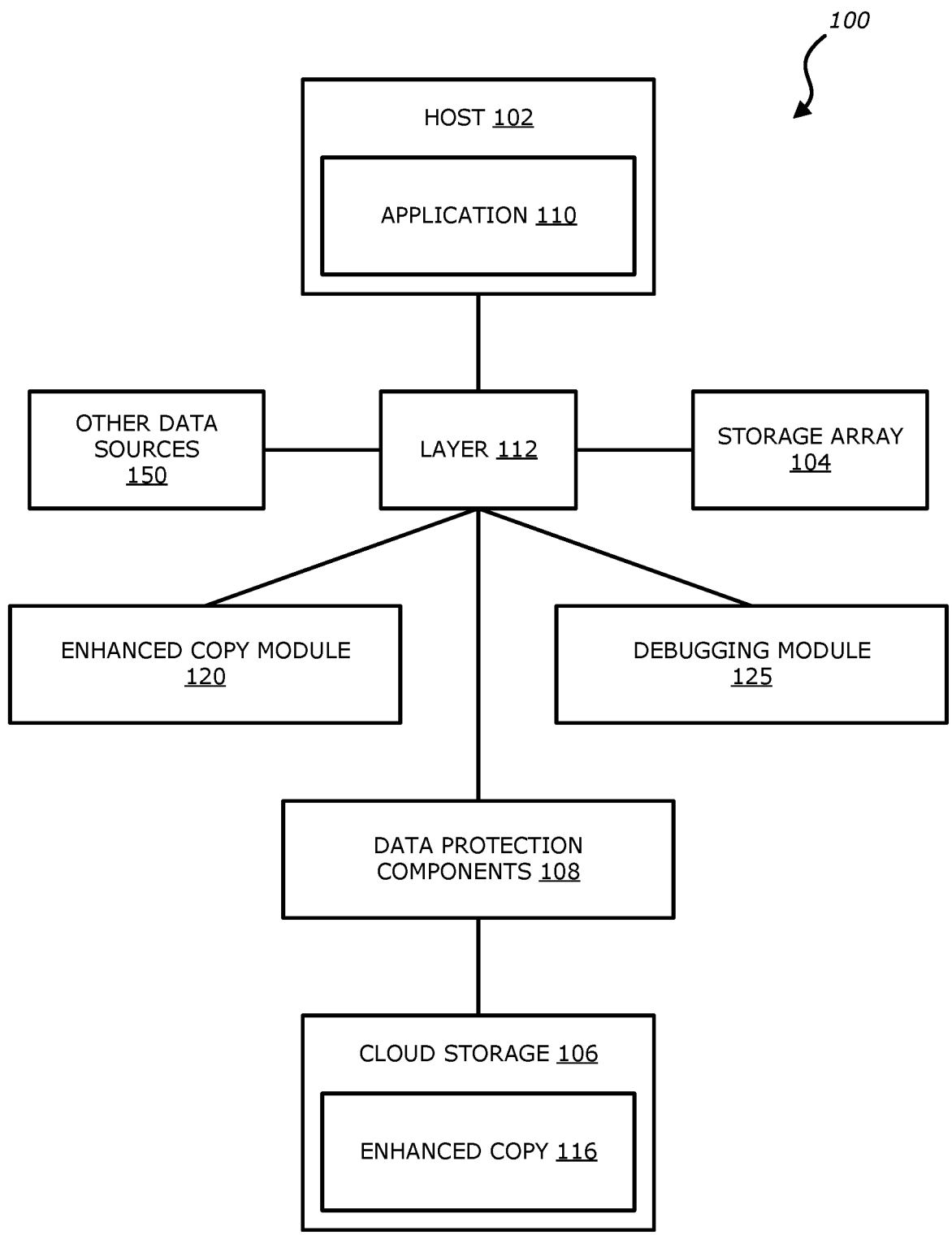
FIG. 1 is a block diagram illustrating an example system for automatically reproducing a problem to be debugged according to an embodiment herein.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Generally, the present disclosure relates to an automatic process for reproducing problems or bugs that occur while running an application and preparing an environment at the problematic state for a developer to inspect and debug.

According to one embodiment herein, a problem that occurs during execution of an application is detected, and a first time at which the problem occurred is stored. An enhanced copy of the application (discussed in more detail below with respect to FIG. 1) is restored from a second time that is before the first time at which the problem occurred. The enhanced copy of the application is run and it is determined whether the problem is reproduced while running the enhanced copy. If the problem is reproduced, the application is paused. On the other hand, if the problem is not reproduced, restoring the enhanced copy, running the enhanced copy and determining whether the problem is reproduced are repeated for a pre-designated number of times.

In one embodiment, the enhanced copy includes application data generated from using the application, the application, a configuration of the application and runtime settings to run the application. In some embodiments, the enhanced copy further includes enhanced copy metadata comprising metadata on application operational parameters, parameters to connect to additional resources and information about resources used by the application. Further aspects of the enhanced copy are discussed below with reference to FIG. 1.

In one embodiment, a condition for detecting the problem is received, the condition being one or both of a log file entry and a fault in the application, and the problem is reproduced when the condition is detected while running the enhanced copy of the application.

In one embodiment, recent application data traffic is stored.

In one embodiment, the enhanced copy of the application is restored from a stored copy.

In one embodiment, if the problem occurs again and the application is paused, a user is notified.

By virtue of the arrangements illustrated herein, it is typically possible to reduce the time, effort and resources spent by a developer on reproducing and resolving issues occurring during production and development. This is particularly advantageous in situations where the application is running in a complex environment and a conventional manual solution is often time consuming or unsuccessful in reproducing the problem.

Moreover, by virtue of the arrangements herein, it becomes possible to orchestrate a platform in order to reconstruct the environment and circumstances at the time at which the bug occurred. In this regard, the inventors herein have recognized that the process of debugging and reproducing a problem or bug often becomes more difficult if the developer does not own the platform on which an application is running. For example, platform as a service (PaaS) system refers to a category of cloud computing services that provides a platform allowing customers to develop, run, and manage applications without the complexity of building and maintaining the infrastructure typically associated with developing and launching an app. PaaS can be delivered in two ways: as a public cloud service from a provider, where the consumer controls software deployment and configuration settings, and the provider provides the networks, servers, storage and other services to host the consumer's application; or as software installed in private data centers or public infrastructure as a service and managed by internal IT departments. In these circumstances, it is typically difficult for a developer to replicate the circumstances of the problem or bug, since the developer does not have access to the platform. The foregoing is addressed by the disclosure herein by making it possible to replicate the circumstances of the bug, even in cases where the developer does not have control of the platform on which the application runs.

Accordingly, by virtue of the arrangements illustrated herein, it is typically possible to automatically perform a process for reproducing a problem, thereby increasing the likelihood of successfully reproducing the problem and debugging in a fast and efficient manner.

FIG. 1 illustrates a block diagram of an example system for automatically reproducing a problem to be debugged according to an embodiment herein. Referring to FIG. 1, the system 100 includes a host 102, a storage array 104, a cloud storage 106, data protection components 108, a layer 112 and other data sources 150 (e.g., object stores, databases, volumes and so forth). The host 102 includes an application 110.

In one example, the layer 112 includes at least one of a block storage API (application programming interface), an object storage API, a key/value API, a file system API, a database API and a messaging API.

System 100 further includes a debugging module 125 constructed to perform debugging, including identification and reproduction of a bug. According to one example embodiment, debugging module 125 receives a condition for detecting the problem or bug. While the debugging module 125 is shown as a separate block in FIG. 1, in other examples, the debugging module 125 may be located anywhere in system 100 including being in the layer 112.

System 100 also includes an enhanced copy module 120 constructed to generate an enhanced copy 116. While the enhanced copy module 120 is shown as a separate block in FIG. 1, in other examples, the enhanced module 120 may be located anywhere in system 100 including being in the layer 112.

Cloud storage 106 stores the enhanced copy 116. An enhanced copy 116 includes application data and other data to be able to regenerate data. For example, other data may include the application and the whole operating environment which may include run time environment, run time parameters, data, data copies and any other data needed for the application 110 to operate.

Accordingly, in one example embodiment, the enhanced copy 116 includes application data, the application, application configuration and runtime settings. For example, the enhanced copy 116 may include an executable image of a particular version that was running at the time of the copying, application data that was being accessed by the application, and application metadata describing the circumstances of the application and the application data. In some examples, application data is a consolidation copy of data sources of the application. These data copies may be generated using existing backup/replication technologies or any other method and are in some examples a set of different copies of different sources.

With respect to application metadata, in some embodiments, the enhanced copy 116 further includes metadata including metadata on application operational parameters (which describe how to run the application), number of instances, scale out parameters, and availability information. The application metadata may describe an operating environment that hosted the application (e.g., a processor, a memory, a storage device, a network interface, etc. involved at the time).

In one embodiment, metadata includes parameters to connect to additional resources, such as databases, object stores, data volumes, file systems, or any service that application was consuming at the time. In some embodiments, the metadata may further include metadata providing information about resources used by the application, for example IDs, names, and/or types. In one embodiment, the metadata further includes metadata controlling the execution of the application at the time. In another example, the metadata further includes metadata related to enhanced copy 116 itself, for example the timestamp, sizes, technologies, and compression/archiving types. In some embodiments, the application metadata may further include parameters controlling whether to restore all of the above features/services, or partial of the features/services, restore only the data instead of the executable image of the application. The parameters may also control the way the runtime environment is set up. For example, a restoration for a development environment may not restore all the runtime services or may restore them at a lower service level agreement (SLA), etc.

In some examples, the application itself is stored to be able to restore and access the data with the correct application version of a particular point in time, which according to one embodiment includes the application itself and the applications that generated the data copies. In some example embodiments, the application configurations enable the application to be run from the enhanced copy. In some examples, runtime settings enable the environment to be mimicked, including allocation of proper processing resources (e.g., processor, memory, storage, operating system, network stack, proper system clock). Certain services that were utilized or connected with may also be restored based on the application metadata. It is therefore possible to restore a full working copy of the application of a particular point in time, rather than just the application data.

According to one example, when an application is restored, an operating environment or execution environment will be established and configured based on the application metadata, including allocating proper resources, even setting up a system clock reflecting the time of the capture and copying. A virtual machine may be provisioned and configured based on the application metadata, which mimics substantially the same operating environment at the time of the copying or capturing of the corresponding snapshot. An executable image of the application is then executed within the operating environment and the application data is loaded into the memory and accessible by the application.

It is therefore advantageously possible create a copy of the application in which the configurations, settings and environment (including clocks) appear to the developer to be moved back to those of the run time environment at the time of interest (e.g., the time at which the problem or bug was detected), even if available services have changed or been removed. In fact, it becomes possible to provide the developer with a copy of the application where the environment is identical to the environment at the time of the problem or bug.

For more detail, see U.S. patent application Ser. No. 14/978,351 filed Dec. 22, 2015 by Assaf Natanzon, et al., the contents of which are incorporated by reference herein.

Note that some or all of the components as shown and described above (e.g., debugging module 125) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
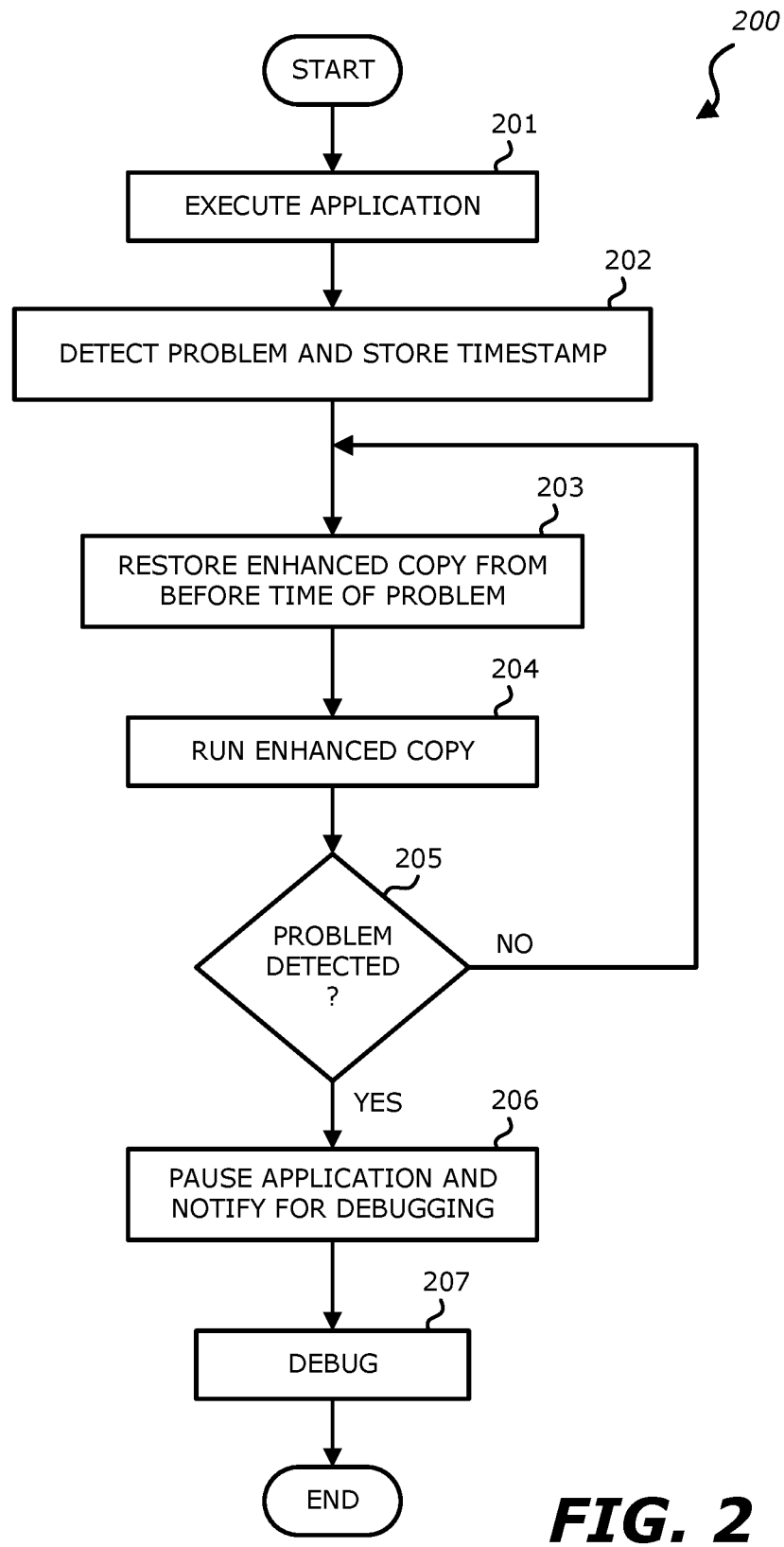
FIG. 2 is a flow diagram illustrating an example method for automatically reproducing a problem to be debugged according to an embodiment herein.

FIG. 2 illustrates a flow diagram of an example process for debugging by automatically reproducing a problem to be debugged, according to an embodiment herein. In this regard, the following embodiments may be described as a process 200, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 200 may be performed by processing logic that includes hardware (e.g. circuitry, dedicated logic, etc.), software (e.g., embodied on a non-transitory computer readable medium), or a combination thereof. In one example embodiment, process 200 is executed by the debugging module 125.

Referring to FIG. 2, at block 201, the application 110 is run. At block 202, the problem or bug is detected. In some example embodiments, the time at which the problem occurred is stored in any one or more of storage array 104, cloud storage 106 and other data sources 150.

In one example embodiment, in order to detect the bug at block 202, debugging module 125 initiates an "AutoDebugger" feature. Once the feature is on, if the problem or bug is detected, block 203 is initiated.

In one embodiment, debugging module 125 receives a condition for detecting the problem. In this case, a developer or user can specify what type of problem or bug is of interest by designating a condition, and the problem is detected or reproduced when the condition occurs. For example, the condition can be one or both of a log file entry and a fault in the application or system. With respect to a log file entry, the developer can set the condition to be a certain type of error, message or metadata that represent detection of the bug. In one example, the condition can be a regular expression or string in a log. According to this embodiment, if the expression is detected in the log, the bug is considered to be detected.

In one example embodiment, system 100 includes multiple logs, including one or more system logs and one or more application logs. System logs can be created by an operating system or runtime environment (e.g., Vmware, Docker) and are not typically application specific. Application logs can be created by an application. According to this example embodiment, the developer may set the condition to be either an application log occurrence or a system log occurrence, or any combination thereof.

In some embodiments, system 100 includes an event system having names, events, alerts, alarms, warnings, or other notifications, which may be included in a log. A developer may set the condition to be one or more of such events.

With respect to a fault in the application or system, in this case, the developer can specify that a problem occurs if the application or system simply crashes or breaks down. In this regard, according to some embodiments, host 102 provides health monitoring for system 100. The health monitoring system can be adjusted by the developer, for example, to indicate a fault if the memory exceeds a threshold amount at a certain time. In another example, the health monitoring system can perform anomaly detection (e.g., a fault occurs if data traffic peaks to a disproportionate level or if there is an unusual data pattern). In other embodiments, an external monitoring system is provided that collects system information (e.g., logs, statuses, statistics, performance, load, utility) and tools to perform analytics such as anomaly detection.

One of ordinary skill in the art will appreciate that other types of conditions can be set by the developer in order to identify a pattern associated with the problem or bug. In addition, one or more of the foregoing conditions can be set by the developer at once.

In one example embodiment, debugging module 125 receives additional information from the developer, including specification of the system that the developer is interested in reproducing for study and the time frame of interest (e.g., the time at which the problem or bug occurred).

After the problem or bug is detected at block 202, process 200 initiates block 203 to restore the enhanced copy 116 from a time before (earlier than) the timestamp stored at block 202. In one embodiment, the most recent enhanced copy 116 is restored by restoring all "point in time" images (e.g., captures of a volume or disc at a specific point in time) from one or more backups or copies stored on cloud storage 106. Note that the term of "copy" or "copies" throughout this application refers to data that is stored according to a variety of data protection methods or processes, such as, for example, backup, replication, mirroring, snapshots, clones, copying, archiving, file system versioning, traffic replay or any other technology. The copied data may be complete copies, diff copies, incremental copies, or any transformation of data representation including but not limited to compression, deduplication and encryption. In addition, combinations and/or multiples of these as parts of a copy (e.g., some parts of the application replicated, some parts backed-up) or sequencing of these (e.g., taking a snapshot, replicating that snapshot, taking a backup of the replicated snapshot, archiving that backup). This is especially relevant for the application bundles where different parts of the application may be protected by different protection technologies.

Since the enhanced copy 116 is restored, it is advantageously possible create a copy of the application in which the configurations, settings and environment (including clocks) appear to the developer to be moved back to those of the run time environment at the time of interest (e.g., the time at which the problem or bug was detected), even if available services have changed or been removed. In fact, it becomes possible to provide the developer with a copy of the application where the environment is identical to the environment at the time of the problem or bug.

Furthermore, it becomes advantageously possible to reconfigure the environment of the system 100 to provide more information for debugging. In this regard, when the application is first executed at block 201, it is sometimes inefficient to save additional information since storage takes up resources. In these circumstances, when enhanced copy 116 is run, it becomes possible to save the additional information such as statistics and logs.

According to one example embodiment, after restoring enhanced copy 116, recent requests and other data traffic received by the application are stored in order to run the enhanced copy at block 204. This traffic can be stored in any one or more of storage array 104, cloud storage 106 and other data sources 150. In this example, only requests made since the time of the most recent enhanced copy 116 need to be stored. Accordingly, it is advantageously possible to manage this process using random access memory (RAM) instead of other resources.

At block 204, enhanced copy 116 is run using the stored traffic. In one embodiment, the enhanced copy is run from a time before the problem was detected to the time at which the problem was detected. As one example, the enhanced copy is run from 1 second before the time at which the problem was detected. In other examples, this time period can be set by the developer according to various considerations.

In one example embodiment, enhanced copy 116 is run using non-production data (e.g., development test data or backend data). For example, in situations where a problem or bug is related to interactions between services or to an amount of traffic, it is not necessary to obtain and use the actual production data that has been backed up (copied) and stored. Rather, according to this embodiment, debugging module 125 uses data similar to the actual production data.

On the other hand, in situations where a problem or bug is specific to the actual data on production, enhanced copy 116 is run using the actual production data associated with the time of interest.

At block 205, it is determined whether the problem is detected again (i.e., reproduced) while running enhanced copy 116. In embodiments where a condition was received at block 202, the problem is detected if the condition occurs. In this regard, according to one embodiment, a search process searches one or more logs (e.g., system log(s) and/or application log(s)) to determine whether the condition is satisfied. For example, if the received condition is an expression, the problem is detected when the expression is found in the log. According to another embodiment, if the received condition is a threshold for memory, the problem is detected when the memory exceeds the threshold.

If it is determined at block 205 that the problem has been detected ("YES" at block 205), process 200 moves to block 206 in which the application is paused. In one example, the application is paused at a time just before the problem has been detected (for example, 1 second before). According to some embodiments, a notification is also sent to the developer or team, and in one embodiment the notification includes information regarding the time at which the problem was detected. As one example, the developer can be notified that the problem will occur in 1 second from the time the application was paused.

At block 207, the problem is investigated and debugged.

If it is determined at block 205 that the problem has not been detected ("NO" at block 205), process 200 returns to block 203. Debugging module 125 repeats blocks 203 to 205 for a pre-designated number of times, or until the problem is detected ("YES" at block 205). As one example, the pre-designated number of times is 10. As another example, particularly in cases where a problem or bug is statistical, the pre-designated number of times is "N", where "N" is the frame of time in which the problem occurs. One of ordinary skill will appreciate that the pre-designated number of times can be set to any number of iterations by the developer according to various considerations.

Figure 3:
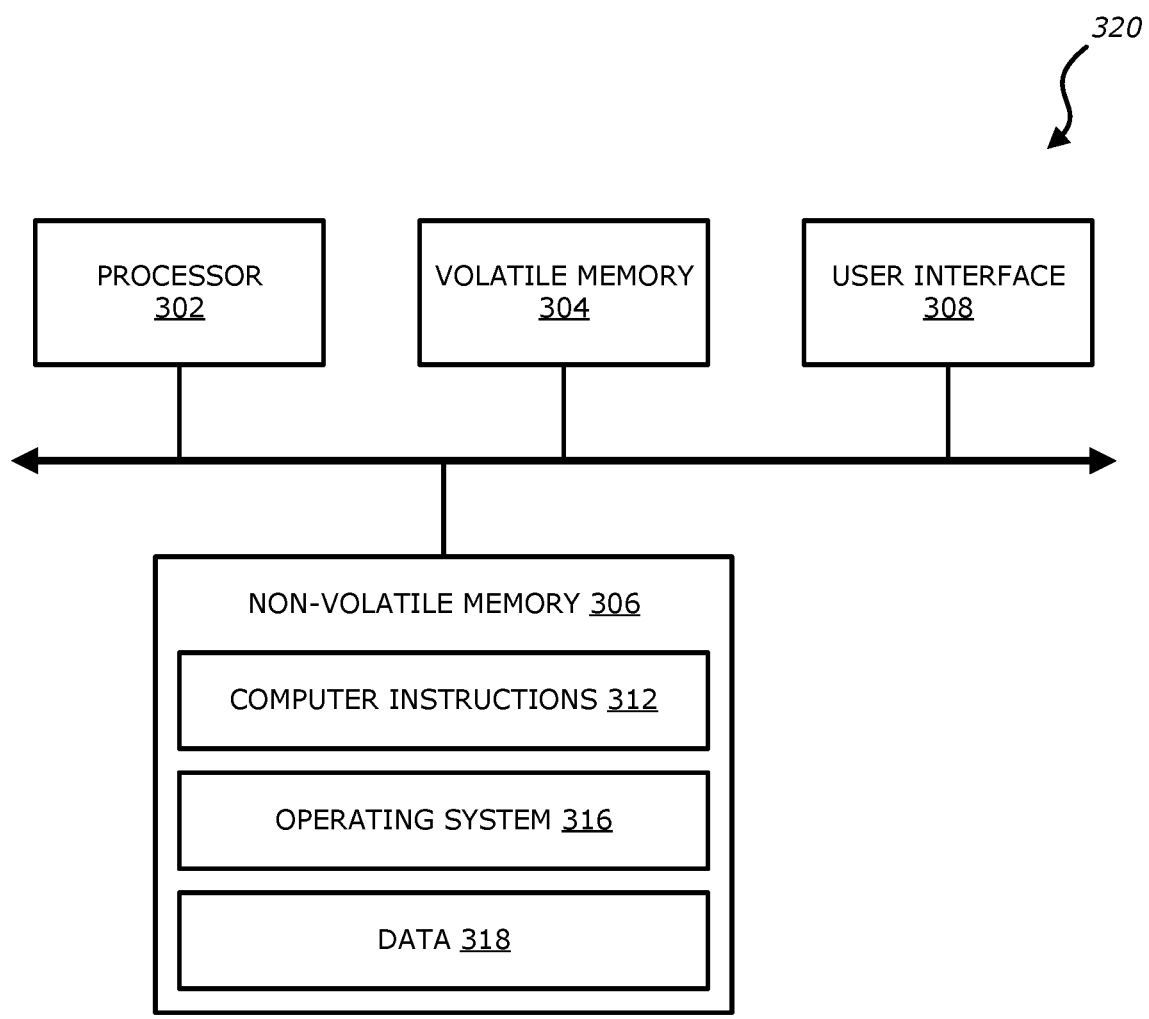
FIG. 3 is a block diagram illustrating an example data processing system on which any portion of the process of FIG. 2 may be implemented according to an embodiment herein.

FIG. 3 illustrates a block diagram of an example of a data processing system which may be used with one embodiment herein. For example, system 320 may represent any of data processing systems described above performing any of the processes or methods described above. System 320 may include many different components that can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 320 is intended to show a high level view of many components of the computer system. However, it is to be understood that additional components may be present in certain implementations and furthermore, different arrangement of the components shown may occur in other implementations. System 320 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 320 includes a processor 302, a volatile memory 304, a non-volatile memory 306 (e.g., hard disk) and a user interface (UI) 308 (e.g., a graphical user interface, a mouse, a touch pad, a touch sensitive screen, a display, a pointer device such as a stylus, a keyboard, and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200). In addition, executable code and/or data of a variety of operating systems, device drivers, firmware (e.g., input output basic system or BIOS), and/or applications can be loaded in the memory and executed by processor 302.

In one embodiment, system 320 may also include input/output devices (not shown) such as audio devices (e.g., a speaker, a microphone), universal serial bus (USB) ports, parallel ports, serial ports, a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Input/output devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system 320

To provide for persistent storage of information such as data, applications, one or more operating systems and so forth, a mass storage (not shown) may also couple to processor 302. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 302, e.g., via a serial peripheral interface (SPI). This flash device may provide for non-volatile storage of system software, including a basic input/output software (BIOS) as well as other firmware of the system.

Processor 302 may represent a single processor or multiple processors with a single processor core or multiple processor cores included therein. Processor 302 may represent one or more general-purpose processors such as a microprocessor, a central processing unit (CPU), or the like. More particularly, processor 302 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 302 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 302, which may be a low power multi-core processor socket such as an ultra-low voltage processor, may act as a main processing unit and central hub for communication with the various components of the system. Such processor can be implemented as a system on chip (SoC).

According to one example embodiment, debugging module 125 is stored in non-volatile memory 306 and is executed by the processor 302 to cause system 320 to function in accordance with the techniques discussed herein.

FIG. 3 is merely one example of a particular implementation and is merely intended to illustrate the types of components that may be present in the system 320. Note that while system 320 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

The processes described herein are not limited to the specific examples described. For example, process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, process 200 can be implemented in any combination hardware devices and software components.

Embodiments of the present invention are not described with reference to any particular programming language. It will be appreciated that a variety of programming languages may be used to implement the teachings of embodiments of the invention as described herein.

While several embodiments have been described herein, those of ordinary skill in the art will recognize that the embodiments are merely examples and can be practiced with modification and alteration within the spirit and scope of the appended claims. In addition, elements of different embodiments described herein may be combined to form other embodiments not specifically set forth above. The description is thus to be regarded as illustrative instead of limiting. There are numerous other variations to different aspects of the embodiments described above, which in the interest of conciseness have not been provided in detail. Accordingly, other embodiments are within the scope of the claims.

The invention claimed is:

1. A method for reproducing a problem in a Platform as a Service (PaaS) environment, comprising:
    detecting a problem that occurs during the execution of an application in the PaaS environment, wherein the PaaS environment includes a plurality of PaaS services for consumption by the application, and wherein the application is hosted on an operating environment, wherein the operating environment includes one or more processors, a storage device, a network interface, and a system clock reflecting a time at which the operating environment is created;
    storing a timestamp at which the problem occurred in the PaaS environment;
    restoring, on a virtual machine in the PaaS environment, an enhanced copy of the application from a time instance that is prior to the stored timestamp, including:
        provisioning the virtual machine to run the enhanced copy of the application, using a point-in-time image of each of the plurality of PaaS services from the time instance prior to the stored timestamp;
        creating, on the virtual machine in the PaaS environment, a runtime environment that mimics the operating environment of the executing application and runs the enhanced copy of the application, the enhanced copy including a version of the executing application, application data generated from using the version of the executing application, a configuration and one or more runtime settings to run the version of the executing application, wherein the runtime environment mimics proper allocation, from the operating environment, for the one or more processors, the storage device, the network interface, and the system clock reflecting a time at which the operating environment is created of the operating environment;
    continuing to receive subsequent requests directed to the application;
    after the enhanced copy of the application is restored, storing, in a random access memory (RAM), the subsequent requests directed to the application, beginning from a further time instance after the detected problem occurred in the application, wherein the subsequent requests are different from previous requests made to the application, prior to the problem being detected; and
    reconfiguring the runtime environment to run the enhanced copy of the application by preparing the enhanced copy of the application to save a set of statistics and further log information of the enhanced copy of the application;
    running the enhanced copy of the application on the virtual machine, using the reconfigured runtime environment and the stored subsequent requests beginning at the further time instance;
    detecting whether the problem is reproduced while running the enhanced copy with the subsequent requests, including:
        saving the set of statistics associated with the enhanced copy of the application;
        logging the information in one or more log files, the information including runtime environment information and interaction result information of the stored subsequent requests;
        receiving a condition, the condition specifying a regular expression or a string in the one or more log files for the enhanced copy of the application;
        searching each of the one or more log files to determine whether the condition is found in the log file, based on the interaction result information; and
        determining whether the problem is reproduced, based on the presence of the condition in the one or more log files;
    if the problem is reproduced:
        pausing the enhanced copy of the application; and
        debugging the reproduced problem; and
    if the problem is not reproduced, repeating operations of restoring, running and detecting for up to a pre-designated number of times, based on the set of statistics, until the problem is reproduced.

2. The method of claim 1, wherein the enhanced copy further comprises enhanced copy metadata comprising metadata on application operational parameters, parameters to connect to additional resources and information about resources used by the application.

3. The method of claim 1, wherein the condition is a fault in the application.

4. The method of claim 1, further comprising storing recent application data traffic.

5. The method of claim 1, wherein the enhanced copy of the application is restored from a stored copy.

6. The method of claim 1, wherein if the problem occurs again and the application is paused, a user is notified.

7. A data processing system for reproducing a problem in a Platform as a Service (PaaS) environment, comprising:
    a processor; and
    a memory coupled to the processor for storing instructions, when executed by the processor, cause the processor to:
        detecting a problem that occurs during the execution of an application in the PaaS environment, wherein the PaaS environment includes a plurality of PaaS services for consumption by the application, and wherein the application is hosted on an operating environment, wherein the operating environment includes one or more processors, a storage device, a network interface, and a system clock reflecting a time at which the operating environment is created;

storing a timestamp at which the problem occurred in the PaaS environment;

restoring, on a virtual machine in the PaaS environment, an enhanced copy of the application from a time instance that is prior to the stored timestamp, including:
  provisioning the virtual machine to run the enhanced copy of the application, using a point-in-time image of each of the plurality of PaaS services from the time instance prior to the stored timestamp;
  creating, on the virtual machine in the PaaS environment, a runtime environment that mimics the operating environment of the executing application and runs the enhanced copy of the application, the enhanced copy including a version of the executing application, application data generated from using the version of the executing application, a configuration and one or more runtime settings to run the version of the executing application, wherein the runtime environment mimics proper allocation, from the operating environment, for the one or more processors, the storage device, the network interface, and the system clock reflecting a time at which the operating environment is created of the operating environment;
  continuing to receive subsequent requests directed to the application;
  after the enhanced copy of the application is restored, storing, in a random access memory (RAM), the subsequent requests directed to the application, beginning from a further time instance after the detected problem occurred in the application, wherein the subsequent requests are different from previous requests made to the application, prior to the problem being detected; and
  reconfiguring the runtime environment to run the enhanced copy of the application by preparing the enhanced copy of the application to save a set of statistics and further log information of the enhanced copy of the application;

running the enhanced copy of the application on the virtual machine, using the reconfigured runtime environment and the stored subsequent requests beginning at the further time instance;

detecting whether the problem is reproduced while running the enhanced copy with the subsequent requests, including:
  saving the set of statistics associated with the enhanced copy of the application;
  logging the information in one or more log files, the information including runtime environment information and interaction result information of the stored subsequent requests;
  receiving a condition, the condition specifying a regular expression or a string in the one or more log files for the enhanced copy of the application;
  searching each of the one or more log files to determine whether the condition is found in the log file, based on the interaction result information; and
  determining whether the problem is reproduced, based on the presence of the condition in the one or more log files;

if the problem is reproduced:
  pausing the enhanced copy of the application; and
  debugging the reproduced problem; and if the problem is not reproduced, repeating operations of restoring, running and detecting for up to a pre-designated number of times, based on the set of statistics, until the problem is reproduced.

8. The system of claim 7, wherein the enhanced copy further comprises enhanced copy metadata comprising metadata on application operational parameters, parameters to connect to additional resources and information about resources used by the application.

9. The system of claim 7, wherein the condition is a fault in the application.

10. The system of claim 7, further comprising circuitry constructed to store recent application data traffic.

11. The system of claim 7, wherein the enhanced copy of the application is restored from a stored copy.

12. The system of claim 7, wherein if the problem occurs again and the application is paused, a user is notified.

13. The system of the claim 7, wherein the circuitry comprises at least one of a processor, a memory, a programmable logic circuit and a logic gate.

14. A non-transitory computer-readable storage medium storing computer-executable instructions for reproducing a problem in a Platform as a Service (PaaS) environment, the instructions causing a machine to execute a process comprising:

detecting a problem that occurs during the execution of an application in the PaaS environment, wherein the PaaS environment includes a plurality of PaaS services for consumption by the application, and wherein the application is hosted on an operating environment, wherein the operating environment includes one or more processors, a storage device, a network interface, and a system clock reflecting a time at which the operating environment is created;

storing a timestamp at which the problem occurred in the PaaS environment;

restoring, on a virtual machine in the PaaS environment, an enhanced copy of the application from a time instance that is prior to the stored timestamp, including:
  provisioning the virtual machine to run the enhanced copy of the application, using a point-in-time image of each of the plurality of PaaS services from the time instance prior to the stored timestamp;
  creating, on the virtual machine in the PaaS environment, a runtime environment that mimics the operating environment of the executing application and runs the enhanced copy of the application, the enhanced copy including a version of the executing application, application data generated from using the version of the executing application, a configuration, and one or more runtime settings to run the version of the executing application, wherein the runtime environment mimics proper allocation, from the operating environment, for the one or more processors, the storage device, the network interface, and the system clock reflecting a time at which the operating environment is created of the operating environment;
  continuing to receive subsequent requests directed to the application;

after the enhanced copy of the application is restored, storing, in a random access memory (RAM), the subsequent requests directed to the application, beginning from a further time instance after the detected problem occurred in the application, wherein the subsequent requests are different from previous requests made to the application, prior to the problem being detected; and reconfiguring the runtime environment to run the enhanced copy of the application by preparing the enhanced copy of the application to save a set of statistics and further log information of the enhanced copy of the application;

running the enhanced copy of the application on the virtual machine, using the reconfigured runtime environment and the stored subsequent requests beginning at the further time instance;

detecting whether the problem is reproduced while running the enhanced copy with the subsequent requests, including:

saving the set of statistics associated with the enhanced copy of the application;

logging the information in one or more log files, the information including runtime environment information and interaction result information of the stored subsequent requests;

receiving a condition, the condition specifying a regular expression or a string in the one or more log files for the enhanced copy of the application;

searching each of the one or more log files to determine whether the condition is found in the log file, based on the interaction result information; and determining whether the problem is reproduced, based on the presence of the condition in the one or more log files;

if the problem is reproduced:
pausing the enhanced copy of the application; and
debugging the reproduced problem; and if the problem is not reproduced, repeating operations of restoring, running and detecting for up to a pre-designated number of times, based on the set of statistics, until the problem is reproduced.

15. The non-transitory computer-readable storage medium of claim 14, wherein the enhanced copy further comprises enhanced copy metadata comprising metadata on application operational parameters, parameters to connect to additional resources and information about resources used by the application.

16. The non-transitory computer-readable storage medium of claim 14, the process further comprising receiving a condition for detecting the problem, wherein the condition is one or both of a log file entry and a fault in the application, and wherein the problem is reproduced when the condition is detected while running the enhanced copy.

17. The non-transitory computer-readable storage medium of claim 14, the process further comprising storing recent application data traffic.

18. The non-transitory computer-readable storage medium of claim 14, wherein the enhanced copy of the application is restored from a stored copy.

19. The non-transitory computer-readable storage medium of claim 14, wherein if the problem occurs again and the application is paused, a user is notified.

* * * * *